No. 676,301. Patented June 11, 1901.
W. BRANDON.
SELF FEEDER AND BAND CUTTER.
(Application filed Apr. 27, 1900.)
(No Model.) 4 Sheets—Sheet 1.
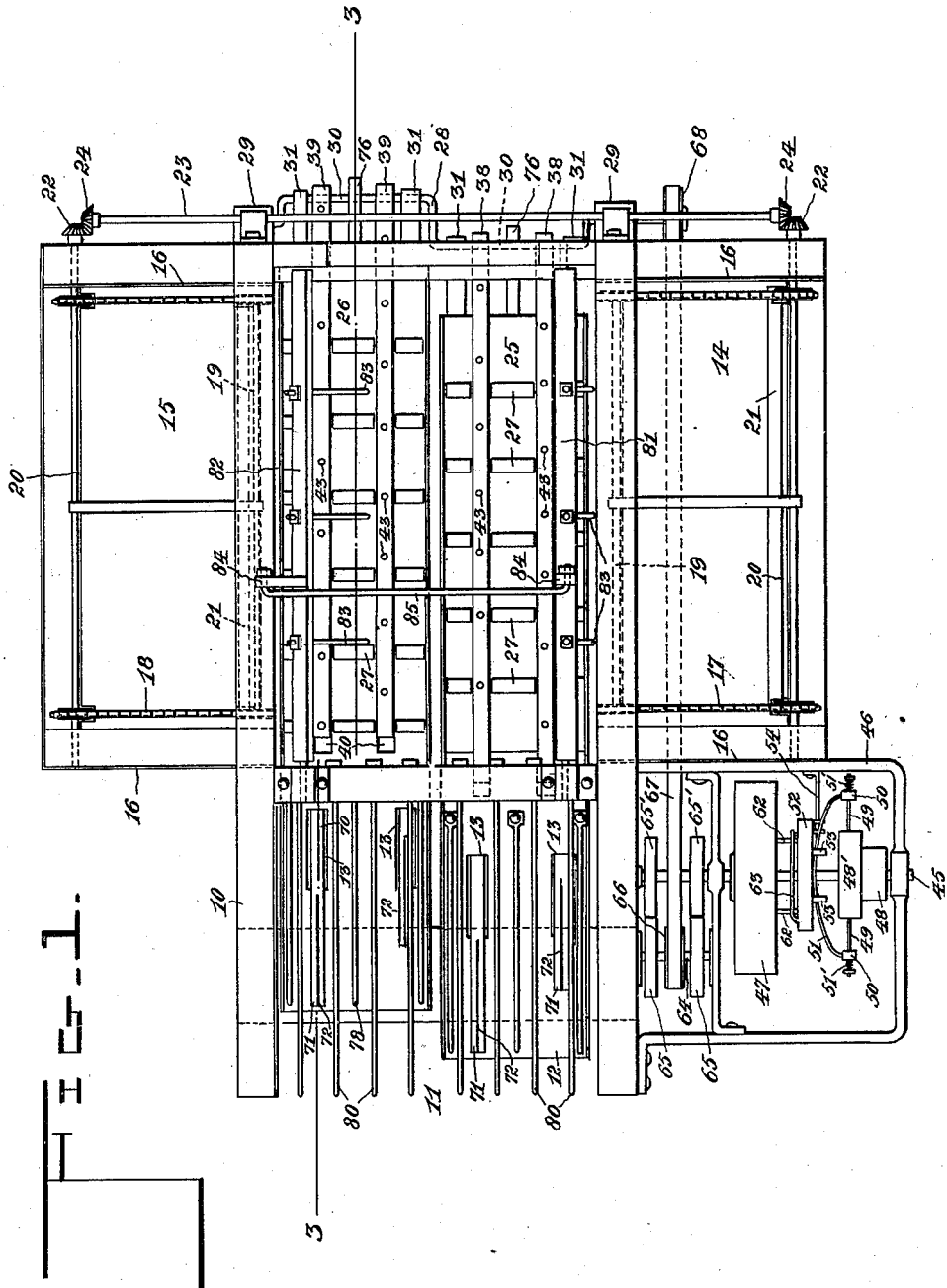
Witnesses: William Brandon, Inventor
By Marion Marion
Attorneys

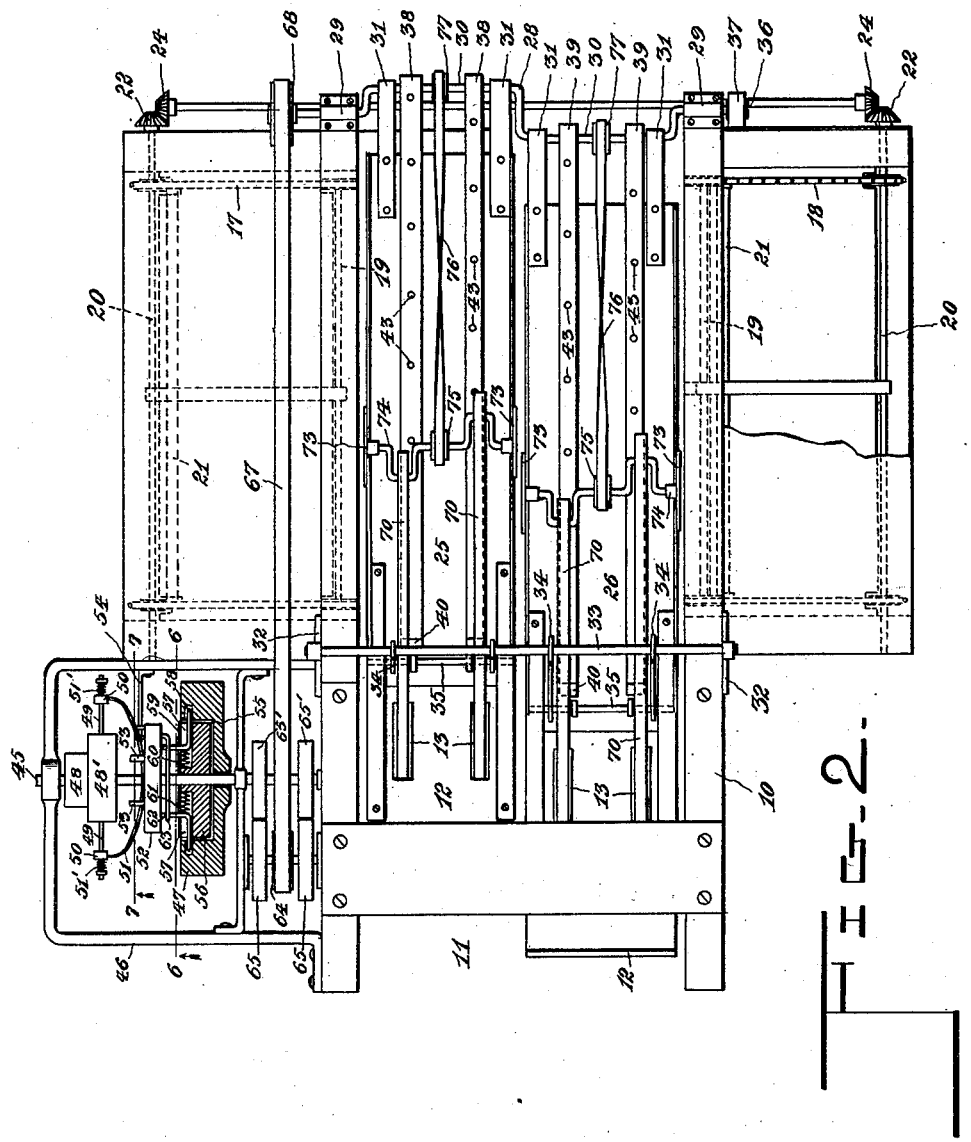

No. 676,301. Patented June 11, 1901.
W. BRANDON.
SELF FEEDER AND BAND CUTTER.
(Application filed Apr. 27, 1900.)
(No Model.) 4 Sheets—Sheet 3.
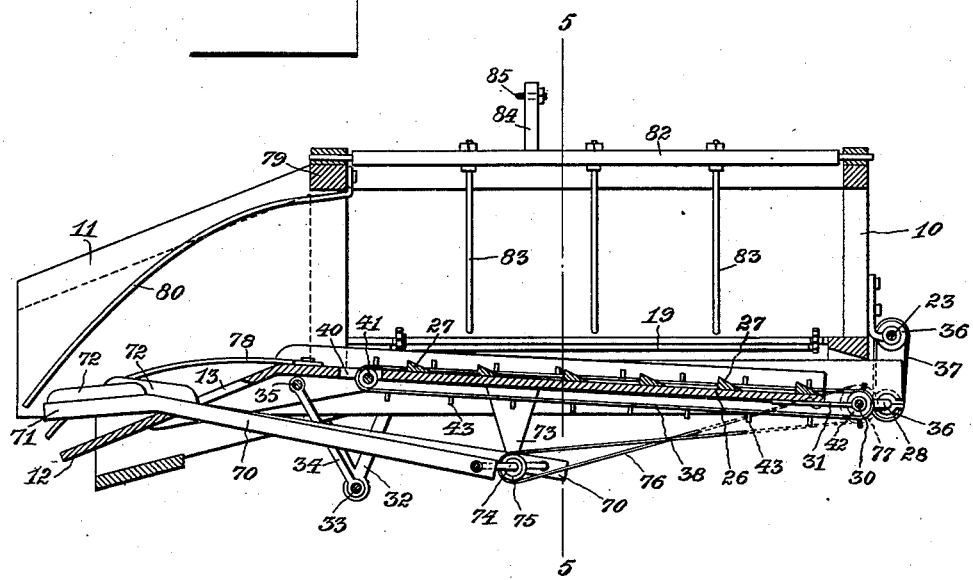
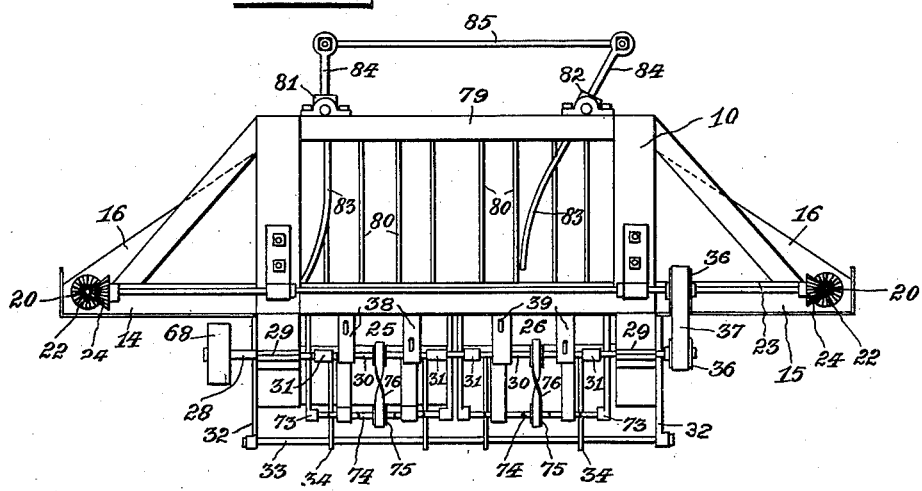
Witnesses:
John F. Denfferwiel
H J Bernhard
William Brandon, Inventor
By Marion Marion
Attorneys No. 676,301. Patented June 11, 1901.
W. BRANDON.
SELF FEEDER AND BAND CUTTER.
(Application filed Apr. 27, 1900.)
(No Model.) 4 Sheets—Sheet 4.
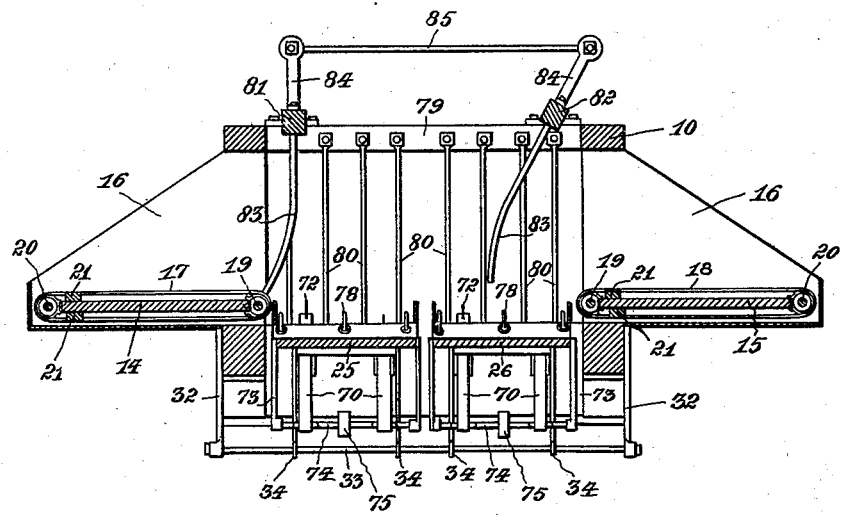
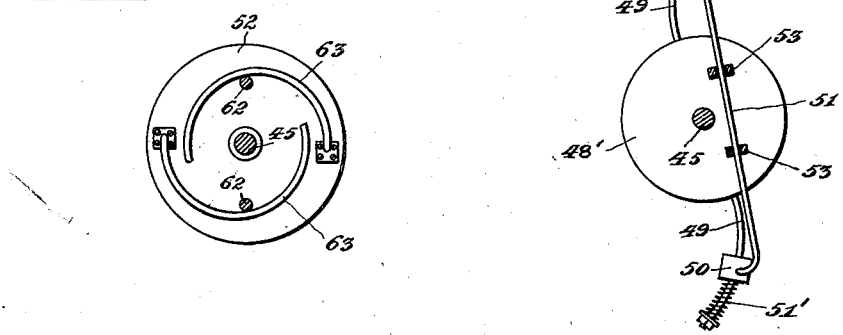
Witnesses:
John F. Deufferwiel
H. F. Beruhard
William Brandon, Inventor
By Marion Marion
Attorneys

UNITED STATES PATENT OFFICE.

WILLIAM BRANDON, OF KINSMORE, CANADA.

SELF-FEEDER AND BAND-CUTTER.

SPECIFICATION forming part of Letters Patent No. 676,301, dated June 11, 1901.

Application filed April 27, 1900. Serial No. 14,536. (No model.)

*To all whom it may concern:*

Be it known that I, WILLIAM BRANDON, a subject of Her Majesty the Queen of Great Britain, residing at Kinsmore, county of Dennis, Province of Manitoba, Canada, have invented certain new and useful Improvements in Self-Feeders and Band-Cutters; and I do hereby declare that the following is a full, clear, and exact description of the invention, such as will enable others skilled in the art to which it appertains to make and use the same.

My invention relates to improvements in band-cutters and feeders designed for application to threshing-machines and grain-separators; and the primary object is to provide an improved mechanism into which a sheaf or bundle of grain may be deposited in one side or the other of the machine, thence transferred automatically to a contrivance that moves the sheaf or bundle to the band-cutting knives, and finally the bundle or sheaf is loosened up, whereby the grain may be supplied in a loose free condition to the threshing-cylinder.

A further object is to provide an improved band-cutter and feeder mechanism of large capacity adapted to receive grain sheaves from either side and to associate with the duplex mechanism certain devices that operate to permit but one sheaf at a time to pass into the feeder proper, thus obviating too rapid feeding of the grain and the consequent "choking" of the cylinder.

A further object is to provide means operable in connection with the feed mechanism proper, which means serves the twofold purpose of cutting the bands and of kicking or thrusting the grain in a loosened condition to the threshing-cylinder.

A further object is to provide a speed-regulating mechanism which is operatively combined to the feeder to reduce the speed of the latter in case the threshing-cylinder is fed too rapidly, thereby contributing to the efficiency of the apparatus.

Further objects and advantages of the invention will appear in the course of the subjoined description and the novelty in the combination of parts, as well as in the construction and arrangement thereof, will be defined by the claims.

In the drawings, Figure 1 is a top plan view of a band-cutter and feeder mechanism embodying my invention. Fig. 2 is an inverted or bottom plan view of the structure, the clutch-controlled friction wheel or pulley being shown in section. Fig. 3 is a longitudinal sectional view taken in the plane of the dotted line 3 3 on Fig. 1. Fig. 4 is an end elevation. Fig. 5 is a transverse section through the complete apparatus on the plane of the dotted line 5 5 on Fig. 3. Figs. 6 and 7 are transverse sectional views, on an enlarged scale, through the speed-regulating mechanism and in the planes indicated by the dotted lines 6 6 and 7 7, respectively, on Fig. 2.

The same numerals of reference are used to indicate like and corresponding parts in each of the several figures of the drawings.

The frame 10 of the band-cutter and feeder may be of any suitable construction to sustain the various working parts of the apparatus, and it is my practice to construct this frame with a delivery end 11, that is disposed at an angle to the major length of the frame. In the inclined end 11 is arranged to work the end sections 12 of the feed-boards 25 26, and said end sections are provided with the longitudinal slots 13, adapted to accommodate the angular ends of the pusher-bars which carry the band-cutting knives, as will be hereinafter fully described.

The frame 10 is provided at its opposite sides with the tables 14 15, the latter being firmly secured to said frame. The guards 16 are attached to the side and end edges of the tables for the purpose of preventing the grain from falling off the latter. The tables are traversed by the endless conveyers 17 18, respectively, each conveyer being supported at one end by sprockets or pulleys on an idler-shaft 19, that is journaled at the inner edge of the table. The outer end of each conveyer is sustained by sprockets or pulleys on a driving-shaft 20, each conveyer consisting, preferably, of sprocket-chains or aprons which carry the slats 21, adapted to sweep across the table and force the grain into the main frame, where it is received upon suitable reciprocating feed-boards 25 26. The elevator-driving shafts 20 extend longitudinal with the tables, and they are provided with the beveled gear-pinions 22, the latter having intermeshing engagement with similar beveled gears 24 on a horizontal transverse shaft 23, which is journaled at the outer end of the main frame, whereby this shaft serves as the means for driving both of the feed-conveyers. The feed-boards 25 26 extend longitudinally of the main frame within the limits of the latter and between the tables, and these feed-boards are mounted and driven in a manner to be capable of a longitudinal reciprocating motion. The feed-boards are disposed adjacent to the side tables and the feed-conveyers which traverse said tables, and said feed-boards are adapted to individually receive the sheaves of grain which are supplied to the machine by the respective feed-conveyers 17 18, whereby one conveyer supplies the grain to the one feed-board and the other conveyer feeds the grain to the other feed-board. Each feed-board is provided at intervals with cross-slats 27, which have beveled faces on one side and abrupt faces on the other side, adapted to permit the grain to pass over the slats and to check the backward movement of the grain, respectively.

A crank-shaft 28 is arranged across the front end of the main frame 10, so as to be supported in a horizontal position by the bearings 29, and this shaft is provided with cranks 30, disposed in the same plane as the feed-boards 25 26. A series of straps 31 is employed to connect the outer end of each feed-board with one of the cranks of the shaft, whereby the feed-board is supported at one end by the shaft and is reciprocated by the crank thereof on the rotation of the shaft. Near the other end 11 of the frame is provided a series of brackets 32, which support a pivotal rod 33 below the path of the reciprocating feed-boards, and on this pivotal rod is loosely mounted a series of links or arms 34, each pair of which is connected by a bolt 35 with one reciprocating feed-board for the purpose of supporting the inner end portion of the latter. It is to be observed that each feed-board has its inner portion supported by swinging links or arms, while its outer portion is upheld by a crank of the shaft, whereby on the rotation of the shaft the crank gives a reciprocating motion to the feed-board and the links or arms swing on the pivotal rod, so as to permit of such reciprocating play of the feed-board.

The shaft 23, which propels the drive-shafts of the feed-conveyers, is driven from the crank-shaft 28 through suitable gearing, and in the drawings this gear between the two shafts is represented as pulleys 36, secured to the respective shafts and connected by an intermediate belt 37, although sprocket-and-chain gearing may be employed.

Each feed-board is equipped with two or more bands 38 39, which pass through slots 40, provided near the inner ends of said feed-boards, said inner portions of the bands being supported by idler-pulleys 41, which are suitably supported in or adjacent to the slots. The crank of the shaft 28, to which the feed-board is connected by the straps 31, is provided with drive-pulleys 42, around which pass the bands, and the rotation of the crank-shaft on its axis serves to rotate these pulleys 42, which propel the bands longitudinally of the feed-board. Each band is provided with the teeth 43, arranged to project substantially flush with the slats 27 on the feed-boards, and the bands and the feed-boards are driven by the crank-shaft for the purpose of conveying the grain to the end 11 of the feeder.

The several mechanisms which are embraced in my band-cutter and feeder are propelled from a primary shaft 45, which in turn is driven from the cylinder-shaft of the threshing-machine. This primary shaft is journaled in a supplemental frame 46, which is made fast with the inner portion of the main frame. Loosely mounted on this primary shaft is a belt-pulley 47, adapted to receive a belt (not shown) which engages with a pulley on the cylinder-shaft. The main belt-pulley 47 rotates idly on the primary shaft, and another pulley 48 is also fitted idly on the shaft 45 at one side of the pulley 47, said pulley 48 being also driven by a belt (not shown) from a part of the threshing-machine. The pulleys 47 48 are thus propelled or driven separately, and the pulley 48 operates a centrifugal governor mechanism. Said governor-pulley 48 has a section 48', which carries the oppositely-curved rods 49. Centrifugal weights 50 are slidably fitted on these curved rods of the governor-pulley 48, and said weights are connected by a bowed spring 51 and are normally pressed in toward each other by the coiled springs 51'. The slidable member of the speed-regulator is indicated at 52 as being loosely fitted on the primary shaft adjacent to the main shaft-driving pulley 47, and this slidable member is in the form of a disk provided with clips 53, which are engaged by the bowed spring. (See Fig. 7.)

The slidable member 52 of the governor mechanism is held or confined against rotation by an arm or bar 54, which is attached to the frame 46, so as to move a limited distance with the member 52, or it may be of spring material, so as to yield automatically.

The main pulley 47, which is fitted loosely on the primary shaft, is chambered in one side, as at 55, for the reception of a clutch-disk 56, the latter being made fast with the shaft by a key, binding-screw, or its mechanical equivalent. This fast clutch-disk is provided with radial recesses 57, in which are slidably fitted the clutch-dogs 58, the latter being held in place within the recesses by a face-plate 59, which is secured firmly to the disk 56. The clutch-dogs are normally impelled beyond the edge of the clutch-disk by the coiled springs 60, which are housed in the recesses 57, and thus the clutch-dogs engage operatively with the main pulley 47, so as to make the latter fast with the clutch-disk 56. The face-plate 59 is provided with slots 61, through which project the heels 62 of the slidable spring-pressed clutch-dogs, and these heels are adapted to be engaged by the convolute retractors 63, which are made fast with the slidable regulator member 52 on the opposite side thereof to the clips 53.

The bowed spring 51 is of heavy steel material or its equivalent to resist the torsional strain to which it is subjected in transmitting the motion of the pulley 47 to the slidable member 52 of the speed-regulator, and this spring is furthermore connected to the slidable member 52 by a clip, such as 53, which serves to make said member 52 move longitudinally on the shaft when the regulator mechanism attains such a speed that the centrifugal energy of the weights will straighten out the curved spring 51 and overcome the tension of the coiled springs 51', thus sliding the member 52 on the shaft 45. The heels 62 of the clutch-dogs remain in engagement at all times with the convolute retractors 63 on the slidable regulator member 52, and the tension of the pressure-springs for the clutch-dogs is such as to resist the motion of the pulley. It is to be understood that the tension of the several springs is regulated or adjusted so as to permit the main pulley 47 to be driven idly on the clutch-disk 56 at a certain rate of speed from the cylinder of the threshing-machine, while the speed-governor mechanism is propelled idly by the motion of the independently-driven pulley 48 until the threshing-machine attains a certain speed When this speed is reached, the speed of the pulley 48 and the movement of the weights 50 straighten the bowed spring 51 so as to slide the member 52 and permit the retractors 63 to allow the dogs to engage with the pulley 47, whereby the latter is made fast automatically with the clutch and the shaft 45 when the threshing-machine reaches the required speed.

A friction-shaft 64 is removably mounted in suitable bearings provided on the supplemental frame, said shaft being provided with a series of friction-disks 65, which have sufficient frictional engagement with the similar disks 65' on the shaft 45 so as to be driven thereby. The friction-shaft may be dismounted and disks of other sizes substituted for the particular disks in use, thus making provision for variation in speed of the mechanism.

It is evident that the friction driving-shaft 64 may be removably mounted on the framework of the improved band-cutting and feeding mechanism in a number of ways; but as one means for attaining this end I have shown said shaft 64 as having one end supported in a removable bracket-arm, which is detachably bolted to a part of the yoke-shaped bracket 46, as clearly shown by Figs. 1 and 2. The other end of this shaft 64 is fitted in a suitable bearing on the frame of the improved mechanism; but on the removal of the bracket-arm just described from the bracket 46 it is evident that the shaft 64 and the pulleys thereon may be dismounted from the machine.

The friction-shaft 64 has a belt-pulley 66, which is encompassed by a belt 67, that leads to a pulley 68 on the crank-shaft 28 of the machine.

I employ a series of pusher-bars 70, which are disposed primarily below the feed-boards 25 26, each pusher-bar having an angular end 71, that is extended through one of the slots 13 in the end section 12 of the feed-boards 25 or 26. This angular end of each pusher-bar 70 carries a band-cutting knife 72, which is adapted to reciprocate or play at the inner end of the feeder, so as to sever the bands which bind the sheaf of grain. The pusher-bars are preferably disposed in pairs below the feed-boards, and each pair of pusher-bars is propelled from a double crank-shaft which is supported on the under side of one of the feed-boards. A pair of bearing-plates 73 are attached to each board, so as to depend therefrom, and in these plates is journaled a short double crank-shaft 74, with the cranks of which are loosely engaged the forward ends of the pusher-bars, whereby on the rotation of the crank-shaft 74 the pair of pusher-bars 70 will be reciprocated. Each shaft 74 has a pulley 75, which is engaged by a cross-belt 76, driven from a pulley 77 on the crank-shaft 28.

The grain as it passes into the angular end 11 of the frame is lifted somewhat by the action of the yieldable or spring fingers 78, the latter being attached to the angular ends 12 of the feed-boards 25 26. A cross-bar 79 is supported over the inner end of the frame, and it sustains the upper series of yieldable fingers 80, which are curved or inclined toward the lower series of fingers, whereby the two series of fingers coact in confining the grain against flying loose under the action of the pusher-bars.

I employ the oscillatory gates 81 82 between the feed-conveyers 17 18 and the reciprocating feed-boards 25 26, and these gates are connected for simultaneous operation in a manner which makes one gate assume an open position while the other gate is closed, whereby the sheaves supplied by the feed-conveyers 17 18 are delivered alternately to the feed-boards 25 26. Each gate consists of a suitable rock-shaft having a series of fingers 83, said rock-shaft being journaled on the frame 10 immediately over the inner end of one of the feed-conveyers. The rock-shafts of the two gates have the upwardly-extending arms 84, which are connected together by the link or pitman 85, the length of which is such as to make one gate assume the open position and the other gate closed, and vice versa.

The operation may be described as follows: The main pulley of the speed-regulating mechanism may be driven from the threshing-cylinder, a traction-engine, or other source of power, and this pulley 47 and the regulating mechanism operates the friction-gear to drive the main crank-shaft 28, from which the feed-boards, the endless bands, the pushers, and the feed-conveyers are all driven through the gearing hereinbefore described. The bound sheaves are placed alternately on the feed-conveyers and the side tables, and said conveyers move the sheaves against the gates, so as to open the latter by the pressure of the sheaf due to its advancement by the conveyer. The sheaf delivered by each conveyer is deposited upon one of the reciprocating feed-boards, and the motion of this feed-board, together with that of the bands, advance the grain lengthwise of the feeder, so as to subject the bands of the sheaf to the action of the knives on the pushers, said pushers also serving to agitate and loosen up the grain before its delivery to the threshing-machine. In case the feeder operates at a lower rate of speed than is desirable the speed-regulator becomes active to allow the main pulley to slip relative to the clutch-disk, thereby arresting the crank-shaft and the feed mechanism.

While I have herein shown a preferred form of carrying my invention into effect, yet I do not desire to limit myself to such preferred details of construction, but claim the right to use any and all modifications thereof which will serve to carry into effect the objects to be attained by this invention in so far as such modifications and changes may fall within the spirit and scope of my said invention.

I claim—

1. In a band-cutter and feeder, the combination of a frame, the inclined reciprocatory feed-boards supported within said frame, means for alternately reciprocating the feed-boards, the reciprocatory pushers having the band-cutting knives operable near the inner ends of the feed-boards and in the path of the grain, means for actuating the pushers independently of the feed-boards, and endless bands coöperating with the feed-boards, substantially as described.

2. In a band-cutter and feeder, the combination with a frame, and feed-conveyers at the sides thereof, of a feed mechanism disposed between the feed-conveyers and movable in a path at right angles to the path of the grain advanced by said conveyers, the independently and idly mounted gates arranged across the path of the grain advanced by the feed-conveyers, to open alternately and permit the grain to pass first from one feed-conveyer to the feed mechanism, and then from the other feed-conveyer to said feed mechanism, and link connections from one gate to the other, whereby the idly-mounted gates are adapted to be alternately opened solely by the pressure of the grain, as set forth.

3. In a combined feeder and cutter, the combination with a frame, and feed-conveyers at the sides thereof, of a feed mechanism between said conveyers, the overhung idle gates situated between the feed-conveyers and the feed mechanism, a link connecting said gates directly one with the other and arranged to close one gate when the other gate is opened solely by the pressure of the grain advanced by the other conveyer, whereby the gates are actuated automatically and independently of any driving devices, substantially as described.

4. In a band-cutter and feeder, the combination of a main crank-shaft, reciprocating feed-boards pivotally supported at one end and having their other ends operatively connected with the cranks of said shaft, endless toothed bands carried by the feed-boards and also connected with the shaft to be driven thereby, a series of pusher-bars provided with band-cutting knives and operable in the path of the grain beyond the inner ends of the feed-boards and the bands, and means for reciprocating said pushers, substantially as described.

5. In a band-cutter and feeder, the combination of a frame, a main crank-shaft, reciprocating feed-boards connected with said shaft having the angular slotted ends, short independent crank-shafts carried by the feed-boards on the under side thereof, gearing between the main crank-shaft and said short independent crank-shafts, the pushers arranged to play in the slots of the feed-boards and connected with the cranks on the short independent shafts, and knives on said pushers, substantially as described.

6. In a band-cutter and feeder, the combination with a frame, of the inclined feed-boards having the angular slotted inner ends, means for reciprocating said feed-boards, a series of overhead yieldable fingers inclined downwardly toward the angular ends of the feed-boards, another series of yieldable fingers attached to the feed-boards and extending over the angular ends thereof and toward the overhead fingers, the pushers arranged to play in the slots of the angular ends of the feed-boards, band-cutting knives carried by said pushers and means for actuating the pushers simultaneously with the feed-boards, substantially as described.

7. In a band-cutter and feeder, the combination of a main crank-shaft, feed devices operated thereby, a primary shaft, a main pulley loosely mounted on said primary shaft, a clutch-disk fast with the primary shaft and having clutch-dogs normally engaged with said pulley, a rotary member of a speed-regulator mounted idly on said primary shaft and having the curved arms, weights fitted on the arms and connected by a bowed spring, a slidable member connected with said bowed spring and provided with means which are slidably connected with the clutch-dogs, and gearing between the primary shaft and the main crank-shaft, substantially as described.

8. In a band-cutter and feeder, the combination with a main crank-shaft, band-cutting and feeding devices operated thereby, and a driving-shaft, of a primary shaft, a main friction-pulley idly mounted on said primary shaft, a friction-shaft geared to the main crank-shaft and having a friction-disk in operative relation to the main pulley, said friction-shaft being removably mounted, a clutch-disk fast with the primary shaft and normally clutched with the main friction-pulley, and a centrifugal speed-regulator mechanism operable by the primary shaft and having a member connected with said clutch-disk to automatically release the main friction-pulley, as set forth.

9. In a band-cutter and feeder, the combination with a main crank-shaft, feed devices operable thereby, a primary shaft, a main pulley on said primary shaft, and gear connections from the main pulley to the main crank-shaft, of a clutch-disk fast with the primary shaft and normally made fast with the main pulley, and a speed-regulator mechanism having members mounted on the primary shaft and said members connected operatively one to the other for one member to be given a limited slidable movement by the other member under the centrifugal energy developed by a rotary member of the mechanism, said slidable member of said speed-regulating mechanism being connected with elements of the clutch-disk to retract the same from engagement with the main pulley, substantially as described.

10. A feed mechanism comprising a vibrating feed-board mounted at one end on a revoluble crank or eccentric and at the other end movably sustained by a supporting device, and an endless apron running about the vibrating feed-board on pulleys mounted on the feed-board near the ends thereof.

11. A feed mechanism comprising a vibrating feed-board mounted at one end on a revoluble crank or eccentric and having the other end movably sustained by a supporting device, a pulley or pulleys fixed on said crank, another pulley or pulleys suspended at and on the other end of the feed-board, and an apron or aprons provided with ledges running about said feed-boards on said pulleys.

In witness whereof I have hereunto set my hand in the presence of two witnesses.

WILLIAM BRANDON.

Witnesses:
F. STARYDALE,
W. J. STINSON.